United States Patent [19]

Rycenga

[11] 4,403,686

[45] Sep. 13, 1983

[54] MODULAR CHUTE ASSEMBLY

[76] Inventor: Jacob L. Rycenga, 3285 Middlebury La., Birmingham, Mich. 48010

[21] Appl. No.: 268,690

[22] Filed: Jun. 1, 1981

[51] Int. Cl.³ ............................................. B65G 11/00
[52] U.S. Cl. .................................................. 193/2 C
[58] Field of Search ............ 193/2 R, 2 A, 2 C, 2 D; 211/49 R, 49 D; 272/56.5 R

[56] References Cited

U.S. PATENT DOCUMENTS

| | | |
|---|---|---|
| 484,086 | 10/1892 | Cassidy . |
| 686,452 | 11/1901 | Haywood . |
| 1,020,909 | 3/1912 | Johnston . |
| 1,212,524 | 1/1917 | Lucas . |
| 1,382,897 | 6/1921 | Esche .................................. 193/2 R |
| 1,472,427 | 10/1923 | Campbell . |
| 1,789,885 | 1/1931 | Skinner ................................ 193/2 R |
| 2,189,691 | 2/1940 | Travers . |
| 2,218,444 | 10/1940 | Vineyard ........................ 193/2 R X |
| 2,270,909 | 1/1942 | Spizer .............................. 193/2 R X |
| 2,303,976 | 12/1942 | Bawcutt et al. . |
| 4,270,748 | 6/1981 | Ray ..................................... 193/2 A |

*Primary Examiner*—John J. Love
*Assistant Examiner*—Gene A. Church
*Attorney, Agent, or Firm*—Harness, Dickey & Pierce

[57] ABSTRACT

A modular chute assembly for transportation and removal of parts and scrap from production operations in a manufacturing facility. The modular chute assembly is designed to be readily adapted to a variety of special chute configuration requirements and needs. Many complex chute layouts can be attained using the same relatively few basic chute components or modules. The modular chute system is also strong, lightweight, and inexpensive.

24 Claims, 7 Drawing Figures

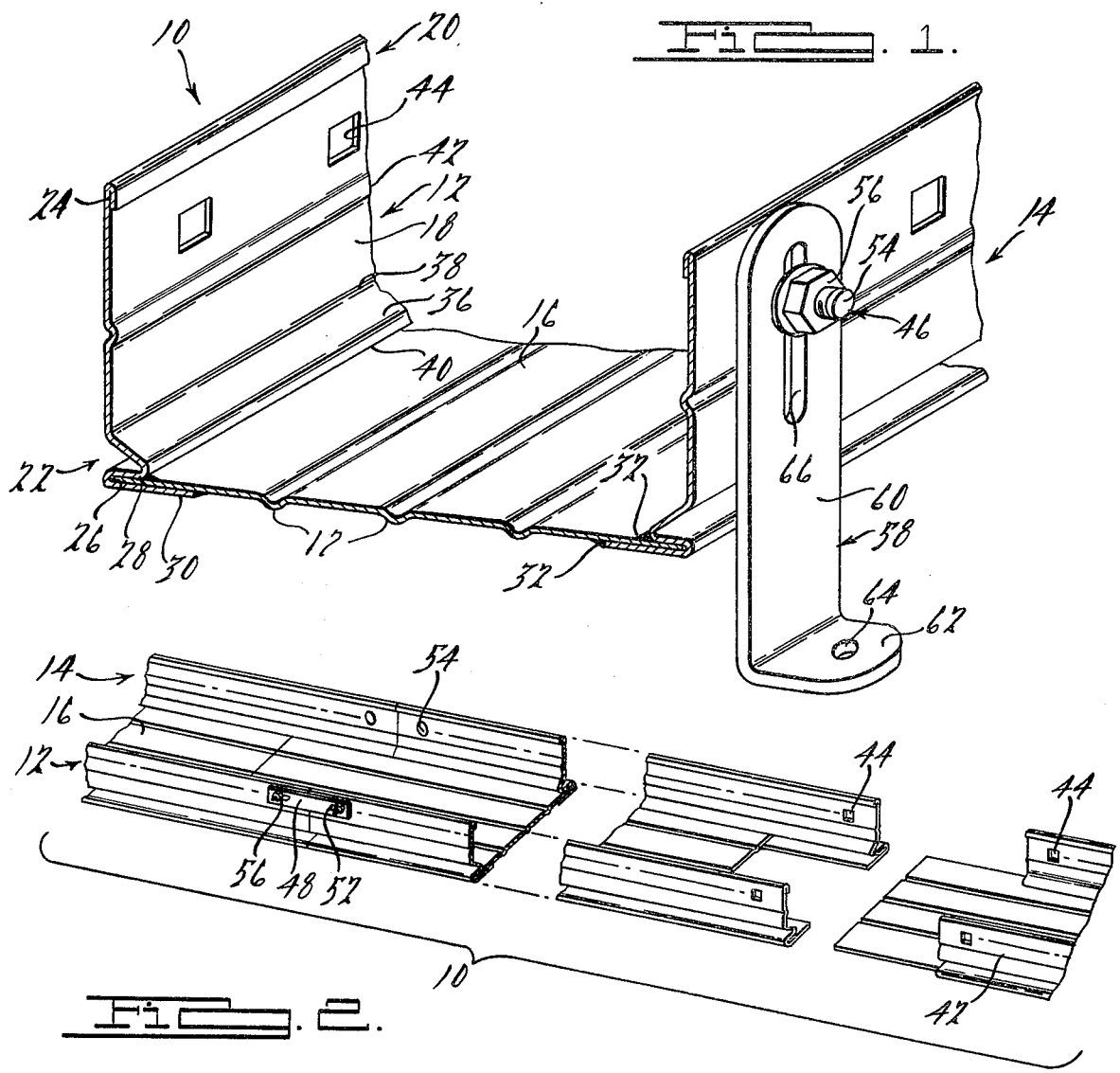
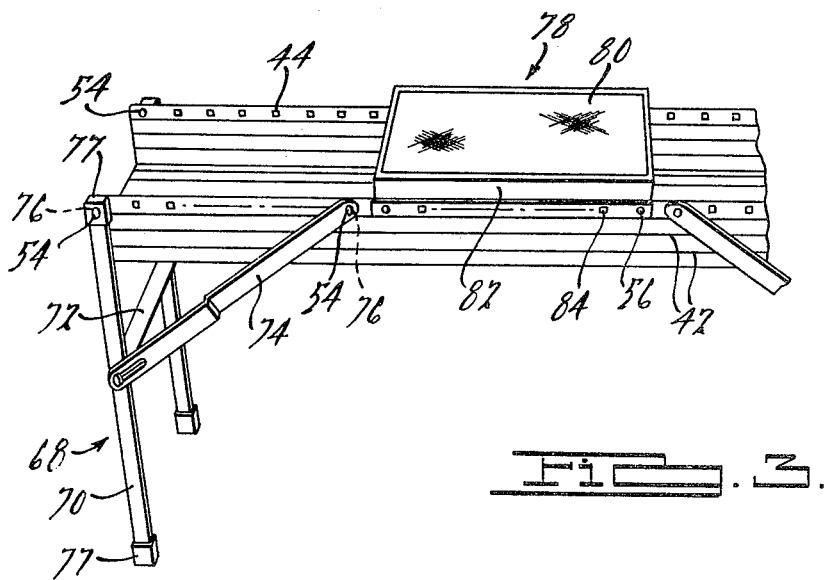

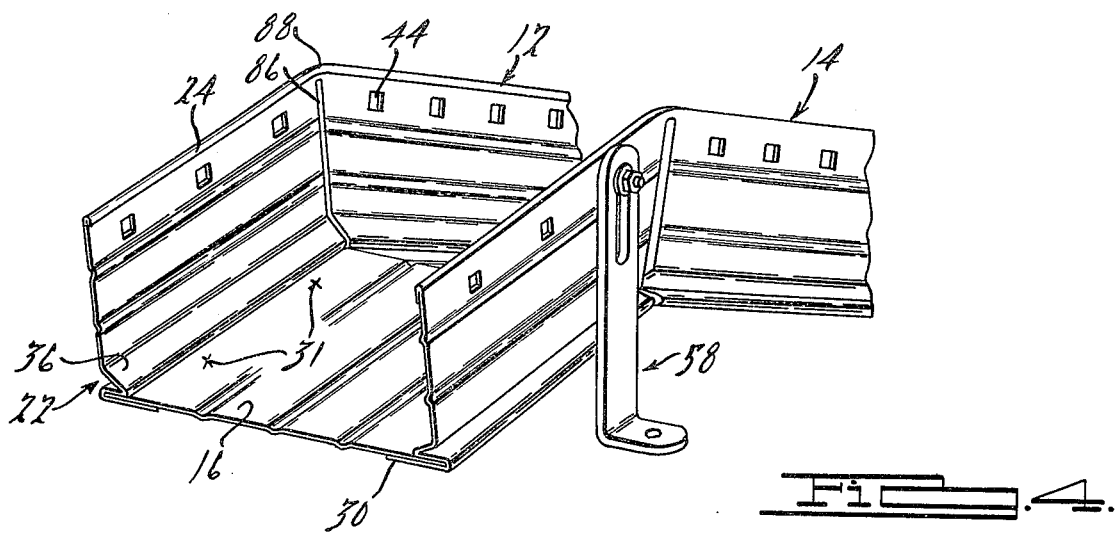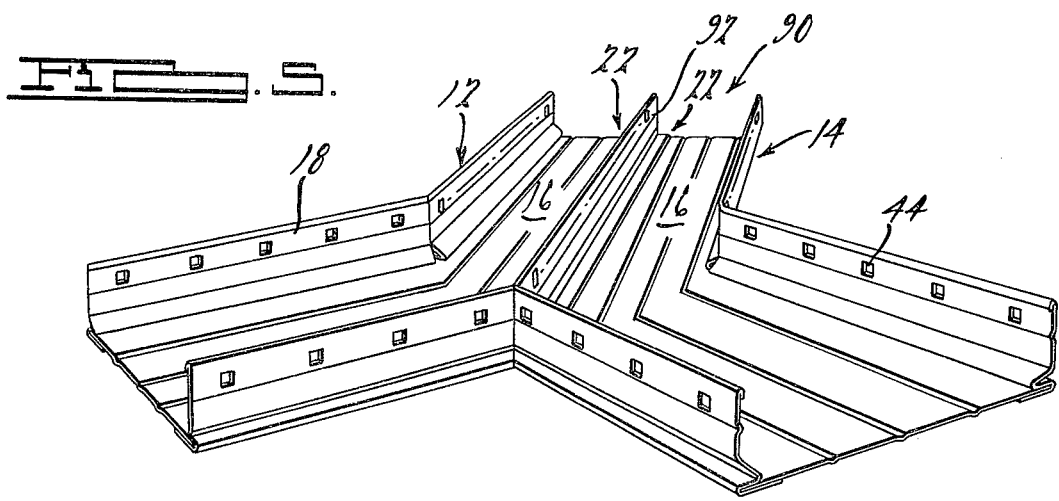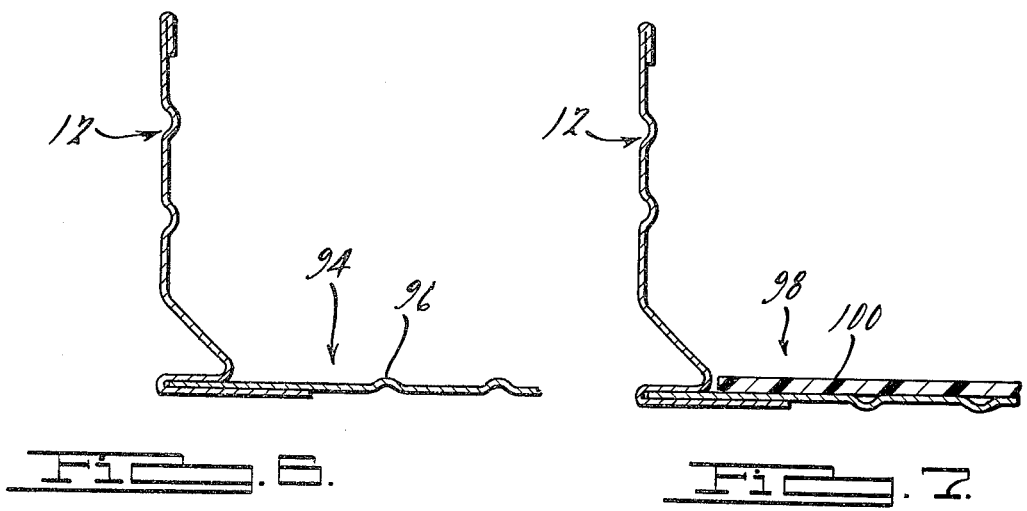

MODULAR CHUTE ASSEMBLY

BACKGROUND AND SUMMARY OF THE INVENTION

The present invention relates to chutes, and more particularly, to a modular chute assembly distinctly suited for removal of parts and scrap from stamping and other production operations in manufacturing facilities. The modular chute assembly can be manufactured with a wide variety of sizes, types, and accessories thereby enabling each chute system or configuration to be custom designed to meet the particular needs and requirements of various users.

In the present age of advanced technology there is an increasing requirement for efficient, automated production operations in manufacturing facilities. An important aspect of these operations is the removal or transportation of parts and scrap. In many manufacturing plants, the problem of parts and scrap removal is often neglected in the press of events leading to the initiation of a new production operation.

Chutes have long been realized and incorporated as a solution to the problem of parts and scrap removal. During a frequently rushed operational startup, however, many shops don't have the time to design or build adequate chutes. As a consequence, parts and scrap find their way to the floor resulting in damaged or lost parts, down time devoted to cleanup operations, and an increased possibility of injury from both handling sharp or dirty scrap and falls caused by stepping on errant parts. Some shops on the other hand have chutes completely engineered and custom built by skilled sheet metal workers at very substantial costs, with long delays for delivery, and resulting in complicated installation procedures.

It is therefore desirable to provide a chute assembly with standardized chutes, acccessories, and installation hardware for immmediate off-the-shelf delivery of all the necessary components needed for a manufacturing plant to create its own custom chute systems in a great variety of sizes and configurations. It is additionally desirable to provide a chute assembly that possesses the properties of strength, durability, long life, safety, and low cost. It is moreover desirable to provide a chute assembly that can be simply, efficiently, and economically produced, as well as readily assembled and installed, therefore resulting in a lower overall expense to the manufacturing plant user.

The modular chute assembly of the present invention consists of various sizes and types of chutes, mounting brackets, and legs for immediate and flexible installations. The chutes are manufactured in essentially three pieces: two identical sides and a bottom. In this way by varying the width of the bottom and the height of the sides, a vast myriad of shapes and sizes can be created from standardized parts. The chutes of the modular chute asssembly may also be constructed with a bottom sliding surface of substantially smooth metal, ribbed metal, or plastic linings to suit the user's needs.

The sides of the chutes contain a plurality of holes for easy mounting of brackets and legs and to enable custom design of the desired chute assembly configuration. A wide range of mounting bracket and leg sizes permits the user to precisely attain the angle required for efficient part or scrap removal.

For safety the modular chute system has no raw edge exposed. Substantial mounting brackets and legs avoid chute collapse with the attendant possibility of personal injury or equipment damage.

Inasmuch as the chute components of the present invention are standardized, they may be made in volume, thus enabling modular chute assemblies to be furnished at a far lower cost than prior known chutes.

The above and other features of the invention will become apparent from a reading of the detailed description of the preferred embodiments, which makes reference to the following set of drawings.

BRIEF DESCRIPTION OF THE DRAWINGS

FIG. 1 is a perspective view, partially in section, showing a portion of the modular chute assembly with a mounting bracket in accordance with the present invention.

FIG. 2 is a perspective view showing the method of assembly of the chute components of the present invention.

FIG. 3 is a perspective view showing a portion of the modular chute assembly supported on mounting legs and containing a bounce screen in accordance with the present invention.

FIG. 4 is a perspective view showing an assembled portion of the modular chute assembly adapted for a change in the slope of the chute assembly.

FIG. 5 is a perspective view of an embodiment of the present invention showing a two-track chute component.

FIG. 6 is a partial sectional view showing the chute bottom of the modular chute assembly in accordance with a first alternative embodiment.

FIG. 7 is a partial sectional view showing the chute bottom of the modular chute assembly in accordance with a second alternative embodiment.

DETAILED DESCRIPTION OF THE PREFERRED EMBODIMENTS

Referring now to the drawings, a portion of the modular chute assembly in accordance with the present invention is shown in FIG. 1 at 10. The modular chute system 10 includes generally two chute sides 12 and 14 and a chute bottom 16. Chute bottom 16 may be a substantially flat, smooth piece of sheet metal of a width corresponding to the specific chute requirements or needs of the customer. Chute bottom 16 is provided with a plurality of grooves or bottom ribs 17. Bottom ribs 17 give added stiffness and stability to chute bottom 16. In the preferred embodiment, bottom ribs 17 are formed to project downward so as to provide the greatest surface area for sliding contact on chute bottom 16. Chute sides 12 and 14 are substantially identical with like portions facing each other. Chute sides 12 and 14 are configured to comprise a substantially flat body portion 18, an upper edge 20 at one end of body portion 18, and a lip means 22 at the other end. Upper edge 20 contains a hem 24 that adds rigidity to the chute sides 12 and 14 and eliminates the raw edge which can cause severe injuries in assembly, installation, and usage. Hem 24 therefore assures safety for operators and setup personnel.

Lip means 22 serves to retainably engage and conceal the lateral edges of chute bottom 16. Lip means 22 also adds rigidity and structural strength to chute sides 12 and 14 and chute bottom 16. Lip means 22 contains a recess 26 that lies substantially perpendicular to chute side 12 or 14. Recess 26 has a recess top 28 and a recess bottom 30. Recess bottom 30 extends inwardly from and perpendicular to chute side 12 or 14. Recess top 28 extends inwardly from chute side 12 or 14 and substantially parallel to recess bottom 30. Recess top 28 does not extend as far inwardly as does recess bottom 30. The vertical width of recess 26 is slightly larger than the vertical width of chute bottom 16 so as to integrally accommodate and retain chute bottom 16 in a structurally sound assembled relationship and further prevent any raw edges from being exposed to create possible injuries or jam ups in the chute system. Recess 26 furthermore adds strength to chute bottom 16 when engaged therewith by serving to prevent longitudinal bending of chute bottom 16.

Chute bottom 16 may be retainably engaged in assembled relationship with chute sides 12 and 14 by brazing or welding chute bottom 16 to lip means 22 of chute sides 12 and 16. This brazing or welding can be accomplished in any number of fashions such as gas, arc, acetylene, etc. Two examples of such fastening are shown on the chute component illustrated in FIGS. 4 and 5 at 31 and in FIG. 1 at 32. A spot weld 31 may be used along chute bottom 16 to fasten chute bottom to recess bottom 30 or an arc or acetylene weld may be utilized between chute bottom 16 and recess bottom 30 and/or recess top 28.

Lip means 22 also comprises portion 36 that is bent or deformed inwardly from body portion 18 and joins body portion 18 and recess top 28. Portion 36 also serves to form two inside, obtuse angle corners 38 and 40 between each chute side 12 and 14 and chute bottom 16. In this manner there is no corner of substantial perpendicularity as in prior known chutes causing parts or scrap to jam within the chute.

Chute sides 12 and 14 are also formed with a rib 42 that protrudes inwardly and runs longitudinally along body portion 18. Rib 42 is utilized on chute sides 12 and 14 to add further strength and rigidity to the body portion 18 that lies between hem 24 and lip means 22 of chute sides 12 and 14. As the height of chute sides 12 and 14 is required to increase for specific chute system applications, additional ribs 42 are formed and equally spaced on body portion 18.

Chute sides 12 and 14 also contain a plurality of equally spaced square holes 44 to provide for easy assembly and installation with fasteners 46 as will be hereinafter further described.

Individual chute components or modules of the modular chute system 10 comprise a chute bottom 16 and two chute sides 12 and 14. The chute components are joined together as shown in FIG. 2. Chute bottoms 16 may be offset or indented with respect to chute sides 12 and 14 to provide a more stucturally sound chute system when two or more modules are utilized in assembled relationship. This offsetting of the seams between successive chute bottoms 16 and the seams between successive chute sides 12 or 14 not only facilitates the assembly and installation processes, but also helps to eliminate jamming of parts or scrap within the chute system by decreasing the existence of multiple locations for parts or scrap to catch and lodge. FIG. 2 also illustrates the possibility of infinite modular chute assembly length options with standardized length components.

Individual chute components are held together in the assembled relationship by connecting brackets 48 and fasteners 46. Connecting brackets 48 are rectangular blanks of sheet metal that are provided with connecting slots 52 that correspond to the outlying square holes 44 of two chute modules as they are joined for assembly. To provide simplicity and ease of assembly and installation of modular chute assembly 10, fasteners 46 may be round-headed carriage bolts 54 with self-locking flange nuts 56. The square protrusions under the round heads of carriage bolts preclude rotation and facilitate assembly when engaged with square holes. When utilized, bolts 54 and nuts 56, then, operate to provide a secure, vibration proof assembly. In fastening chute modules together (or attaching mounting brackets or mounting legs as described below) fasteners 46 are installed so that only round-headed bolts 54 appear on the inside of a chute module. In this manner, the potential jamming of parts or scrap within the chute due to a protruding nut or threaded end of a fastener is non-existent.

FIGS. 1 and 3 illustrate two alternative ways that modular chute system 10 may be mounted or installed for use in manufacturing facility. In FIG. 1, mounting brackets 58 are incorporated for mounting modular chute system 10 close and directly to a production area surface. Mounting brackets 58 consist of a heavy round-edge structural material such as metal and have a variable length vertical portion 60 and a flange 62 that provides a mounting surface for attachment to the production area surface. Flange 62 has a centered hole 64 that is used to retainably secure mounting bracket 58, and hence modular chute system 10, to the production area surface with a suitable fastener. Vertical portion 60 of mounting bracket 58 contains a mounting bracket slot 66 for fastening chute modules to mounting bracket 58 by using bolts 54 and nuts 56 and square holes 44. By varying the length of vertical portion 60, various height mounting brackets are attained for various chute height requirements. Mounting bracket slot 66 allows a variety of mounting heights to be attained with each differently sized mounting bracket 58. For added stability, mounting bracket 58, in the alternative, may be provided with a plurality of mounting bracket holes in place of mounting bracket slot 66.

In FIG. 3, mounting legs 68 are shown for installation applications in which free-standing chute modules are required to be utilized at a substantial distance from a production area floor or other surface. Mounting legs 68 comprise a vertical leg portion 70 that can be manufactured in various lengths to provide various mounting heights and chute angles, one or more horizontal bars 72 to tie together and add stability to leg portions 70 on opposite sides of the chute assembly, and a brace 74 connected to and running between leg portion 70 and chute side 12 or 14 of the chute module. The ends of braces 74 and the top of leg portion 70 have a mounting hole 76. Leg portions 70 and braces 74 are mounted to chute sides 12 and 14 of the chute module in a manner similar to mounting brackets 58, utilizing square holes 44, mounting holes 76, bolts 54, and nuts 56. Mounting legs 68 are also provided with plastic caps 77 to cover the exposed ends of vertical leg portions 70.

Also shown in FIG. 3 is a bounce screen 78 that may be placed over a portion of a chute module just downstream of the point at which parts or scrap are dropped onto the chute module to prevent any parts or scrap from bouncing out of the chute and onto the production area floor where it would pose a safety hazard. Bounce screens 78 may be formed from a piece of sheet metal in which a portion 80 substantially corresponding to the width of chute bottom 16 is perforated and the remaining portions are perpendicularly bent with respect to perforated portion 80 to form bounce screen flanges 82.

Bounce screen flanges 82 have a plurality of bounce screen holes 84 that correspond to square holes 44 to facilitate mounting bounce screen 78 on top of the chute module with bolts 54 and nuts 56.

FIGS. 4, 5, 6, and 7 illustrate additional embodiments of modular chute assembly 10. FIG. 4 shows modular chute assembly 10 utilized in a specific application that requires a change in the fall or slope of chute bottom 16. This may be accomplished by equilaterally notching chute sides 12 and 14 in a V-shaped manner that corresponds to the amount of slope change desired. The respective notched portions of the chute sides can then be brazed or gas welded together with a bead weld 86 of the mig or tig type. While the V-shaped notch illustrated is made from the bottom of chute sides 12 and 14 to provide an increase in slope, the V-shaped notch can also be made from the top of the chute sides to provide a resultant slope decrease. In each procedure the V-shaped notch stops short of going completely through the chute side so that an unnotched portion 88 of each chute side remains. Unnotched portion 88 provides a reference point about which the respective notched portions of the chute sides can be bent to form the change in slope. With respect to a chute side that is notched from the bottom, unnotched portion 88 is the hem 24. For chute sides that are notched from the top, unnotched portion 88 corresponds to recess bottom 30. After the chute sides are notched and bent, the respective chute side portions are then welded to once again provide an integral and continuous chute sidewall. In this way, the need for a separate chute side spacer is eliminated along with the attendant potential of jamming within the chute of parts or scrap catching on the edge of such a spacer. Chute bottom 16 may be bent at an appropriate angle to provide a continuous chute bottom throughout the change in fall or slope and thereby prevent any jamming that might occur in the modular chute assembly 10 resulting from a chute bottom seam at the junction point of the slope change.

FIG. 5 shows an embodiment of modular chute assembly 10 of the present invention adapted to provide a special two-track modular chute system module 90. This two-track component is especially effective for segregation and removal of dissimilar parts, such as right and left hand parts, from the same production machine. In this embodiment, a common interior wall 92 is utilized when two chute tracks are side by side. Interior wall 92 is configured to have a lip means 22 on each side. Interior wall 92 can be simply formed by providing a chute side sheet metal blank of twice the normal width and forming lip means 22 on each side of the blank. Upon folding this blank in half with each lip means 22 protruding opposingly outwardly, interior wall 92 can be achieved. Square holes 44 and ribs 38 may or may not be added to interior wall 92 depending on the specific application required.

FIG. 5 also illustrates how a lateral change in the direction of modular chute assembly 10 may be accomplished. At the desired point of lateral direction change a cut may be made upward through lip means 22 of chute sides 12 and 14. Thereupon, body portion 18 of chute sides 12 and 14 can be bent or deformed to the appropriate angle of desired lateral direction change. Chute sides 12 and 14 can then be retainably assembled to a bottom 16 that is specially produced in one piece to reflect the change in lateral direction. Again, having chute bottom 16 negotiate the lateral direction change in one piece is important in eliminating a seam in bottom 16 near the change in direction that could potentially cause jamming at or near the lateral direction change. In addition to the specialized components noted above, modular chute system 10 can also be adapted to provide tapered, step down, tee, Y, and many other chute module shapes.

FIGS. 6 and 7 illustrate alternative embodiments of chute bottom 16 that are designed to suit a user's special needs. While the chute bottom 16 of the preferred embodiment will handle most chute requirements, to further enhance free sliding of the parts and scrap as it passes along modular chute assembly 10, a first alternative chute bottom 94 may be formed that includes a plurality of alternative bottom ribs 96 as shown in FIG. 6. In most applications, first alternative chute bottom 94 may be provided by inverting the chute bottom 16 of the preferred embodiment, thereby resulting in bottom ribs 17 being deposed upwardly rather than downwardly. In other applications, however, first alternative bottom 94 with its upward projecting alternative bottom ribs 96 must be individually formed. Alternative bottom ribs 96 reduce sliding friction and also serve to stiffen the chute bottom of the modular chute assembly 10. Alternative bottom ribs 96, as depicted in FIG. 6, are formed in a low rounded, triangle fashion. However, alternative bottom ribs 96 may alternatively be formed in a squared-off, rectangular fashion or any other such similar fashion that will produce the desired effects of stiffening and reducing sliding friction by reducing surface contact between the chute bottom and the parts or scrap being transported along the chute system. First alternative chute bottom 94 with its alternative bottom ribs 96, then, is ideally suited for use with flat or oily parts or scrap that possess a potentially large area of surface contact or have other characteristics that impede sliding.

FIG. 7 shows a second alternative bottom 98 that is coated or lined with a plastic layer 100. Plastic layer 100 is ideal for conveying sharp or abrasive materials, provides protection for delicate parts dropped onto the modular chute assembly, and also reduces the noise level that results from the dropping of the parts or scrap onto the chute assembly. Plastic layer 100 may be constructed of an ultra high molecular weight polyethlene such as Tivar or Linabraid that has a high resistance to both abrasion and impact and is highly slippery. Impact plates made from the same material may also be provided to fit chutes exposed to heavy localized impact loads.

The versatility of the modular chute assembly of the present invention provides a distinct advantage over prior known chute devices. While such prior structures are time consuming and expensive to make, modular chute assembly 10 provides a simple, durable, and inexpensive chute system that may be readily adapted to substantially any custom design or chute requirement and is thoroughly efficient and practical in use. Chute sides 12 and 14 may be molded, bent, or otherwise formed to shape and at the same time or afterwards retainably engaged with bottom 16 to form a structure which is light weight and yet substantially rigid.

Modular chute assembly 10 may be made in varying widths, heights, and lengths according to the required use thereof and may be constructed of inexpensive sheet metal or any other material that accomplishes the purposes of durability, strength, light weight, rigidity, malleability, economy, and safety.

In addition to the above-noted features, the present invention then relates to a modular chute assembly that is designed and configured to provide an inexpensive and efficient chute system that can be utilized in manufacturing facilities for the removal of parts and scrap from production operations. The modular chute assembly is quickly and easily adaptable to a variety of removal requirements and needs and is uncomplicated to assemble and install. The modular chute assembly provides suitable mounting brackets and legs to secure the chute at the proper angle of inclination to insure easy and efficient movement of the parts and scrap material along its surface.

Accordingly, the present invention operates to provide a strong, efficient, and low cost modular chute assembly for removal and transportation applications in manufacturing facilities.

While it is apparent that the preferred embodiments of the invention disclosed are well calculated to provide the advantages and features stated, it will be appreciated that the invention is susceptible to modification, variation, and change without departing from the proper scope or fair meaning of the subjoined claims.

What is claimed is:

1. A three-piece modular chute assembly comprising a chute bottom and two chute sides, and chute sides each having a substantially flat body portion with an upper edge at one end and a lip means at the other end, said upper edge having a hem and said lip means including a recess that lies substantially perpendicular to said chute sides, said recess having a recess top and a recess bottom, said recess bottom extending inwardly from and perpendicular to said chute side and said recess top extending inwardly from said chute side and substantially parallel to said recess bottom, said recess bottom extending further inwardly than said recess top, said recess having a vertical width slightly larger than the vertical width of said chute bottom so as to integrally accommodate the edges of said chute bottom, wherein said chute sides and said chute bottom comprise a chute module, said modular chute assembly containing at least one chute module, and whereby said chute bottom and said chute sides are manufactured in varying standard widths and heights so as to be interchangeably combined into said chute module according to each user's chute requirements.

2. A three-piece modular chute assembly as set forth in claim 1, further comprising a portion of said lip means that joins said body portion and said recess top of said lip means, said portion being bent or deformed inwardly from said body portion and forming two inside obtuse angle corners between said chute side and said chute bottom, and a plurality of equally spaced square holes contained in and running longitudinally along said body portion.

3. A three-piece modular chute assembly as set forth in claim 1, further comprising a rib that protrudes inwardly and runs longitudinally along said body portion of said chute side.

4. A three-piece modular chute assembly as set forth in claim 3, wherein more than one said rib is incorporated in each chute side.

5. A three-piece modular chute assembly as set forth in claim 1, wherein a plurality of said chute modules are connected together using connecting brackets and fasteners.

6. A three-piece modular chute assembly as set forth in claim 5, wherein said connecting brackets consist of round-edged, substantially rectangular blanks of structural material that are provided with two connecting slots, said connecting slots corresponding with said square holes that are provided on each end of said chute side of each chute module, said fasteners comprising round-headed carriage bolts and self-locking flange nuts, said chute modules being connected together so that said bolts protrude through said square holes from inside said chute modules and through said connecting holes of said connecting brackets and being retained by said nuts on the outside of said chute modules.

7. A three-piece modular chute assembly as set forth in claim 5, wherein the ends of said chute bottoms are offset or indented with respect to the ends of said chute sides when multiple chute modules are connected.

8. A three-piece modular chute assembly as set forth in claim 1, wherein said chute bottom is a substantially flat, smooth piece of sheet metal or other similar material in which a plurality of bottom ribs are formed to protrude downwardly.

9. A three-piece modular chute assembly as set forth in claim 1, wherein said chute bottom is provided with a plurality of upwardly protruding bottom ribs to reduce sliding friction and stiffen said chute bottom.

10. A three-piece modular chute assembly as set forth in claim 1, wherein said chute bottom is coated or lined with a plastic layer.

11. A three-piece modular chute assembly as set forth in claim 1, wherein said chute bottom is retainably engaged in assembled relationship with said chute sides by welding said chute bottom to said lip means.

12. A three-piece modular chute assembly as set forth in claim 2, wherein said modular chute assembly is mounted to a surface with varying length mounting brackets and mounting legs.

13. A three-piece modular chute assembly as set forth in claim 12, wherein said mounting brackets include a variable length vertical portion, said vertical portion containing a mounting bracket slot, and a flange that provides a mounting surface, said flange having a centered hole for securing said mounting bracket to said surface, said mounting bracket being attached to said modular chute assembly by inserting a round-headed carriage bolt through said square hole from the inside of said chute side and through said mounting bracket slot and retaining said bolt with a self-locking flange nut.

14. A three-piece modular chute assembly as set forth in claim 12, wherein said mounting legs includes a variable length vertical leg portion, said vertical leg portion having a mounting hole at one end, a horizontal bar to tie said vertical leg portions on opposite sides of said modular chute assembly together, and a brace connected to and running between said vertical leg portion and said chute side, said brace having mounting holes at its ends, said brace and said vertical leg portion being attached to said modular chute assembly by inserting a round-headed carriage bolt through from the inside of said chute side and through said mounting hole of said leg or said brace and retaining said bolt with a self-locking flange nut, the other end of said brace being attached to said vertical leg portion with a suitable fastener.

15. A three-piece modular chute assembly as set forth in claim 2, wherein a bounce screen is placed over a portion of said modular chute assembly.

16. A three-piece modular chute assembly as set forth in claim 15, wherein said bounce screen includes a perforated portion substantially corresponding to the width of said chute bottom, and bounce screen flanges that extend perpendicularly downward from said perforated portion, said bounce screen flanges having a plurality of bounce screen holes corresponding to said square holes for fastening thereto by inserting a round-headed carriage bolt from the inside of said chute side through said square hole and said bounce screen hole of said bounce screen flange and retaining said bolt with a self-locking flange nut.

17. A three-piece modular chute assembly as set forth in claim 2, wherein a change in slope of said chute bottom and hence said modular chute assembly is accommodated by equilaterally notching said chute sides in a V-shaped manner at the point of slope change, and in an amount corresponding to the degree of desired slope change, said notched chute sides being welded in the bent position to form a continuous chute side throughout said change in slope.

18. A three-piece modular chute assembly as set forth in claim 17, wherein a portion of said chute side is unnotched to provide a reference point about which said notched chute sides are bent to conform to said change in slope.

19. A three-piece modular chute assembly as set forth in claim 18, wherein said unnotched portion is said hem.

20. A three-piece modular chute assembly as set forth in claim 18, wherein said unnotched portion is said recess bottom.

21. A three-piece modular chute system as set forth in claim 17, wherein said chute bottom is bent at an appropriate angle to provide a continuous chute bottom throughout said change in slope.

22. A three-piece modular chute assembly as set forth in claim 2, further comprising a two-track modular chute assembly module, said two-track module having a pair of said chute sides and a common interior wall, said chute sides each having a parallel chute bottom attached to said lip means of each chute side, said common interior wall having said lip means deposed outwardly on each side to retainably engage said parallel chute bottoms.

23. A three-piece modular chute assembly as set forth in claim 2, wherein the lateral direction of said modular chute assembly can be changed by making a cut upward through said lip means of both of said chute sides and laterally bending or deforming said body portion to the appropriate angle of said lateral direction change.

24. A three-piece modular chute assembly as set forth in claim 23, wherein said chute bottom is configured to reflect the lateral change of direction in one piece.

* * * * *